(12) United States Patent
Donovan (10) Patent No.: US 9,888,001 B2
(45) Date of Patent: Feb. 6, 2018

(54) METHODS, SYSTEMS, AND COMPUTER READABLE MEDIA FOR NEGOTIATING DIAMETER CAPABILITIES

(71) Applicant: Oracle International Corporation, Redwood Shores, CA (US)

(72) Inventor: Steven Robert Donovan, Dallas, TX (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 14/166,772

(22) Filed: Jan. 28, 2014

(65) Prior Publication Data

US 2015/0215167 A1 Jul. 30, 2015

(51) Int. Cl.
*H04L 29/06* (2006.01)
*H04W 12/06* (2009.01)
*H04W 12/00* (2009.01)

(52) U.S. Cl.
CPC ........ *H04L 63/0892* (2013.01); *H04L 63/205* (2013.01); *H04W 12/06* (2013.01); *H04L 63/08* (2013.01); *H04L 63/10* (2013.01); *H04L 63/20* (2013.01); *H04W 12/00* (2013.01)

(58) Field of Classification Search
CPC ..... H04L 63/0892; H04L 69/24; H04L 63/08; H04L 63/20; H04L 63/205; H04L 63/10; H04L 63/18; H04W 8/22; H04W 12/00; H04W 12/06
USPC .................................................. 709/223, 230
See application file for complete search history.

(56) References Cited

U.S. PATENT DOCUMENTS

| | | | |
|---|---|---|---|
| 5,228,083 | A | 7/1993 | Lozowick et al. |
| 6,795,546 | B2 | 9/2004 | Delaney et al. |
| 6,967,956 | B1 | 11/2005 | Tinsley et al. |
| 7,042,877 | B2 | 5/2006 | Foster et al. |
| 7,043,000 | B2 | 5/2006 | Delaney et al. |
| 7,286,516 | B2 | 10/2007 | Delaney et al. |
| 7,383,298 | B2 | 6/2008 | Palmer et al. |
| 7,403,537 | B2 | 7/2008 | Allison et al. |
| 7,466,807 | B2 | 12/2008 | McCann et al. |
| 7,633,872 | B2 | 12/2009 | Pitcher et al. |
| 7,633,969 | B2 | 12/2009 | Caugherty et al. |

(Continued)

FOREIGN PATENT DOCUMENTS

| | | |
|---|---|---|
| CN | 1809072 A | 7/2006 |
| CN | 101252788 A | 8/2008 |

(Continued)

OTHER PUBLICATIONS

Jiao et al., "The Diameter Capabilities Update Application," RFC 6737, pp. 1-6 (Oct. 2012).

(Continued)

*Primary Examiner* — Vivek Srivastava
*Assistant Examiner* — William C McBeth
(74) *Attorney, Agent, or Firm* — Jenkins, Wilson, Taylor & Hunt, P.A.

(57) ABSTRACT

According to one method, the method occurs at a Diameter relay agent including at least one processor and a memory. The method includes receiving first Diameter capabilities information associated with a first Diameter node. The method also includes sending, to at least a second Diameter node, the first Diameter capabilities information.

19 Claims, 7 Drawing Sheets

(56) References Cited

U.S. PATENT DOCUMENTS

| | | | |
|---|---|---|---|
| 7,706,343 B2 | 4/2010 | Delaney et al. | |
| 7,792,981 B2 | 9/2010 | Taylor | |
| 7,916,685 B2 | 3/2011 | Schaedler et al. | |
| 7,961,685 B2 | 6/2011 | Suh et al. | |
| 7,996,007 B2 | 8/2011 | Bantukul | |
| 7,996,541 B2 | 8/2011 | Marathe et al. | |
| 8,045,983 B2 | 10/2011 | Bantukul | |
| 8,170,035 B2 | 5/2012 | Furey et al. | |
| 8,532,110 B2 | 9/2013 | McCann et al. | |
| 9,537,775 B2 | 1/2017 | McMurry et al. | |
| 2005/0002417 A1 | 1/2005 | Kelly et al. | |
| 2006/0045249 A1 | 3/2006 | Li et al. | |
| 2007/0153995 A1 | 7/2007 | Fang et al. | |
| 2008/0167035 A1 | 7/2008 | Buckley et al. | |
| 2008/0250156 A1 | 10/2008 | Agarwal et al. | |
| 2008/0301162 A1 | 12/2008 | Wall et al. | |
| 2008/0317247 A1 | 12/2008 | Jeong et al. | |
| 2009/0185494 A1* | 7/2009 | Li | H04L 45/00 370/389 |
| 2010/0125631 A1* | 5/2010 | Zhang | H04W 28/18 709/204 |
| 2010/0211956 A1 | 8/2010 | Gopisetty et al. | |
| 2010/0251330 A1 | 9/2010 | Kroeselberg et al. | |
| 2011/0060830 A1* | 3/2011 | Kang et al. | 709/224 |
| 2011/0061061 A1 | 3/2011 | Chen et al. | |
| 2011/0199906 A1* | 8/2011 | Kanode | H04L 63/0892 370/235 |
| 2012/0036246 A1* | 2/2012 | Marsico | H04L 41/0654 709/223 |
| 2013/0124712 A1 | 5/2013 | Parker | |
| 2013/0198353 A1* | 8/2013 | Hua | H04L 69/24 709/223 |
| 2013/0227114 A1* | 8/2013 | Vasseur | H04L 41/044 709/224 |
| 2013/0275583 A1* | 10/2013 | Roach | H04L 63/08 709/224 |
| 2014/0304415 A1* | 10/2014 | Prakash et al. | 709/226 |
| 2014/0376380 A1* | 12/2014 | Campbell | H04L 47/10 370/236 |
| 2015/0058414 A1* | 2/2015 | Mann | H04L 63/0892 709/204 |
| 2015/0085663 A1 | 3/2015 | McMurry et al. | |

FOREIGN PATENT DOCUMENTS

| | | |
|---|---|---|
| CN | 2011 8 0008578.6 | 7/2015 |
| EP | 1 328 102 A1 | 7/2003 |
| EP | 1 465 385 A1 | 10/2004 |
| EP | 1 314 324 B1 | 8/2008 |
| EP | 1 847 076 B1 | 2/2012 |
| IL | 221425 | 12/2016 |
| WO | WO 2008/087633 A2 | 7/2008 |
| WO | WO 2009/058067 A1 | 5/2009 |
| WO | WO 2009/070179 A1 | 6/2009 |
| WO | WO 2009/134265 A1 | 11/2009 |
| WO | WO 2011/100626 A2 | 8/2011 |
| WO | WO 2015/041750 A1 | 3/2015 |

OTHER PUBLICATIONS

Fajardo et al., "Diameter Base Protocol," RFC 6733, pp. 1-6 (Oct. 2012).

Letter regarding Notice of Grant for Chinese Patent Application No. 201180008578.6 (dated Jun. 4, 2015).

Letter regarding Office Action for Israel Patent Application No. 221425 (dated May 31, 2015).

Non-Final Office Action for U.S. Appl. No. 14/034,478 (dated Mar. 23, 2015).

Letter regarding Notice Before Examination for Israel Patent Application No. 221425 (dated Jan. 11, 2015).

Second Office Action for Chinese Patent Application No. 201180008578.6 (dated Dec. 9, 2014).

Notification of Transmittal of the International Search Report and the Written Opinion of the International Searching Authority, or the Declaration for International Application No. PCT/US2014/048651 (dated Nov. 17, 2014).

First Office Action for Chinese Application No. 201180008578.6 (dated May 8, 2014).

Tschofenig, "Diameter Overload Architecture and Information Model," draft-tschofenig-dime-overload-arch-00.txt, DIME, pp. 1-10 (Jul. 16, 2013).

"3rd Generation Partnership Project; Technical Specification Group Core Network and Terminals; Study on Diameter overload control mechanisms (Release 12),"3GPP TR 29.809, V0.3.0, pp. 1-52 (Jun. 2013).

Notice of Allowance and Fee(s) Due for U.S. Appl. No. 13/026,144 (dated May 1, 2013).

Interview Summary for U.S. Appl. No. 13/026,144 (dated Mar. 4, 2013).

Communication of European Publication Number and Information on the Application of Article 67(3) EPC for European Patent Application No. 11742921.7 (dated Sep. 12, 2012).

Notification of Transmittal of the International Search Report and the Written Opinion of the International Searching Authority, or the Declaration for International Application No. PCT/US2011/024642 (dated Oct. 28, 2011).

Traffix Systems, "Datasheet; Traffix Signaling Delivery Controller (SDC)," pp. 1-5 (May 2011).

Znaty, "Diameter, GPRS, (LTE+ePC=EPS), IMS, PCC and SDM," EFORT (May 2010). (Part 1 of 2, pp. 1-229).

Znaty, "Diameter, GPRS, (LTE+ePC=EPS), IMS, PCC and SDM," EFORT (May 2010). (Part 2 of 2, pp. 230-460).

3GPP, "3rd Generation Partnership Project; Technical Specification Group Core Network and Terminals; Diameter-based Protocols Usage and Recommendations in 3GPP (Release 9)," 3GPP TR 29.909 V9.0.0 (Dec. 2009).

Tsou et al., "Realm-Based Redirection in Diameter," Internet Engineering Task Force, draft-ietf-dime-realm-based-redirect-02, pp. 1-7 (Oct. 27, 2009).

Bhardwaj, "Roaming Hubbing & LTE," GSMA London, pp. 1-11 (May 19, 2009).

Liu et al., "Introduction to Diameter," Developer Works http://www.ibm.com/developerworks/library/wi-diameter/index.html (Downloaded from the Internet on Aug. 2, 2011), pp. 1-9 (Jan. 24, 2006).

Advisory Action Before the Filing of an Appeal Brief for U.S. Appl. No. 14/034,478 (dated Nov. 17, 2015).

Final Office Action for U.S. Appl. No. 14/034,478 (dated Sep. 8, 2015).

Notice of Allowance for Israel Patent Application No. 221425 (dated Jul. 10, 2016).

Communication of European publication number and information on the application of Article 67(3) EPC for European Patent Application No. 14755210.3 (dated Jul. 6, 2016).

Notice of Allowance and Fee(s) Due and Examiner-Initiated Interview Summary for U.S. Appl. No. 14/034,478 (dated Aug. 25, 2016).

Letter regarding Office Action for Israel Patent Application No. 221425 (dated Apr. 20, 2016).

Non-Final Office Action for U.S. Appl. No. 14/034,478 (dated Apr. 5, 2016).

Extended European Search Report for European Application No. 11742921.7 (dated Dec. 14, 2015).

\* cited by examiner

| NODE IDENTIFIER | CAPABILITIES | RELATED NODE(S) IDENTIFIER(S) |
|---|---|---|
| SERVER-1 | Protocol Version: 1, 1.5<br>Diameter Apps: R, S<br>Diameter Exts: P, M<br>Security: TLS, IPSEC | CLIENT-1<br>CLIENT-2 |
| CLIENT-1 | Protocol Version: 1, 1.5<br>Diameter Apps: X, Y, Z<br>Diameter Exts: K, P, M<br>Security: TLS, IPSEC | SERVER-1<br>SERVER-2 |
| SERVER-2 | Protocol Version: 1<br>Diameter Apps: R, S<br>Diameter Exts: K, M<br>Security: TLS | CLIENT-1<br>CLIENT-2<br>CLIENT-3 |
| CLIENT-2 | Protocol Version: 1, 1.5<br>Diameter Apps: X, Y, Z<br>Diameter Exts: K<br>PSecurity: TLS, IPSEC | SERVER-1<br>SERVER-2<br>SERVER-3 |
| CLIENT-3 | Protocol Version: 1<br>Diameter Apps: S<br>Diameter Exts: M<br>Security: TLS | SERVER-2 |
| SERVER-3 | Protocol Version: 1<br>Diameter Apps: S<br>Diameter Exts. K, P, M<br>Security: TLS | CLIENT-2 |

METHODS, SYSTEMS, AND COMPUTER READABLE MEDIA FOR NEGOTIATING DIAMETER CAPABILITIES

TECHNICAL FIELD

The subject matter described herein relates to communications between Diameter nodes. More specifically, the subject matter relates to methods, systems, and computer readable media for negotiating Diameter capabilities.

BACKGROUND

Diameter is an authentication, authorization, and accounting (AAA) application layer protocol for computer networks, and is a successor to RADIUS. The Diameter base protocol is defined in IETF RFC 6733, the disclosure of which is incorporated by reference herein in its entirety. Diameter communications may use a request-answer message exchange. Diameter routing involves routing of request messages in one direction and answer messages in the reverse direction.

Diameter currently only supports hop-by-hop capabilities negotiation. For example, adjacent nodes typically perform a transaction to determine capabilities, e.g., using capabilities exchange request (CER) messages and capabilities exchange answer (CEA) messages. Sometimes, nodes (e.g., Diameter clients) may require or request services or information from non-adjacent nodes (e.g., Diameter servers). As such, communications between non-adjacent nodes may involve intermediary nodes, such as Diameter relay agents. Diameter relay agents or nodes are Diameter agents that receive and route messages to other Diameter nodes based on information in the messages. However, Diameter relay agents, by definition, do not understand Diameter applications and, as such, generally return an indication of support for all applications. Hence, Diameter clients and Diameter servers typically do not know the Diameter capabilities, including supported Diameter applications, of non-adjacent Diameter nodes.

Accordingly, a need exists for methods, systems, and computer readable media for negotiating Diameter capabilities.

SUMMARY

Methods, systems, and computer readable media for negotiating Diameter capabilities are disclosed. According to one method, the method occurs at a Diameter relay agent comprising at least one processor and a memory. The method includes receiving first Diameter capabilities information associated with a first Diameter node. The method also includes sending, to at least one second Diameter node, the first Diameter capabilities information.

According to one system, the system includes a Diameter relay agent comprising at least one processor and a memory. The Diameter relay agent also includes a Diameter capabilities negotiation relay (DCNR) module implemented using the at least one processor and the memory. The DCNR module is configured to receive first Diameter capabilities information associated with a first Diameter node and to send, to at least one second Diameter node, the first Diameter capabilities information.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for negotiating Diameter capabilities. The Diameter protocol currently defines a capability negotiation mechanism that operates on a hop-by-hop basis. In instances when a Diameter relay is deployed between clients and servers, there is no generic mechanism for clients to learn of the capabilities of servers. While some application specifications address application-related negotiations using point solutions, these solutions are insufficient because that they cannot be reused across multiple applications. Hence, there is no generic Diameter base-protocol mechanism to support capability negotiation between clients and servers in the presence of relays.

In accordance with some aspects of the subject matter described herein, a generic (e.g., non-application specific) mechanism for Diameter capabilities negotiation across Diameter relays, is utilized. For example, a Diameter capabilities negotiation relay (DCNR) agent or a related DCNR module in accordance with some aspects described herein may receive information about Diameter capabilities associated with a first Diameter node and may send this information to a second Diameter node. In this example, the Diameter capabilities negotiation relay (DCNR) agent or a related DCNR module may receive corresponding Diameter capabilities information associated with the second Diameter node and may send this information to the first Diameter node.

In accordance with some aspects of the subject matter described herein, Diameter capabilities information may be stored and/or collected for one or more Diameter nodes and may be provided to one or more Diameter nodes. For example, a Diameter capabilities negotiation relay (DCNR) agent or a related DCNR module in accordance with some aspects described herein may receive information about Diameter capabilities associated with a first Diameter node and may send this information to multiple nodes that have requested to receive such information.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
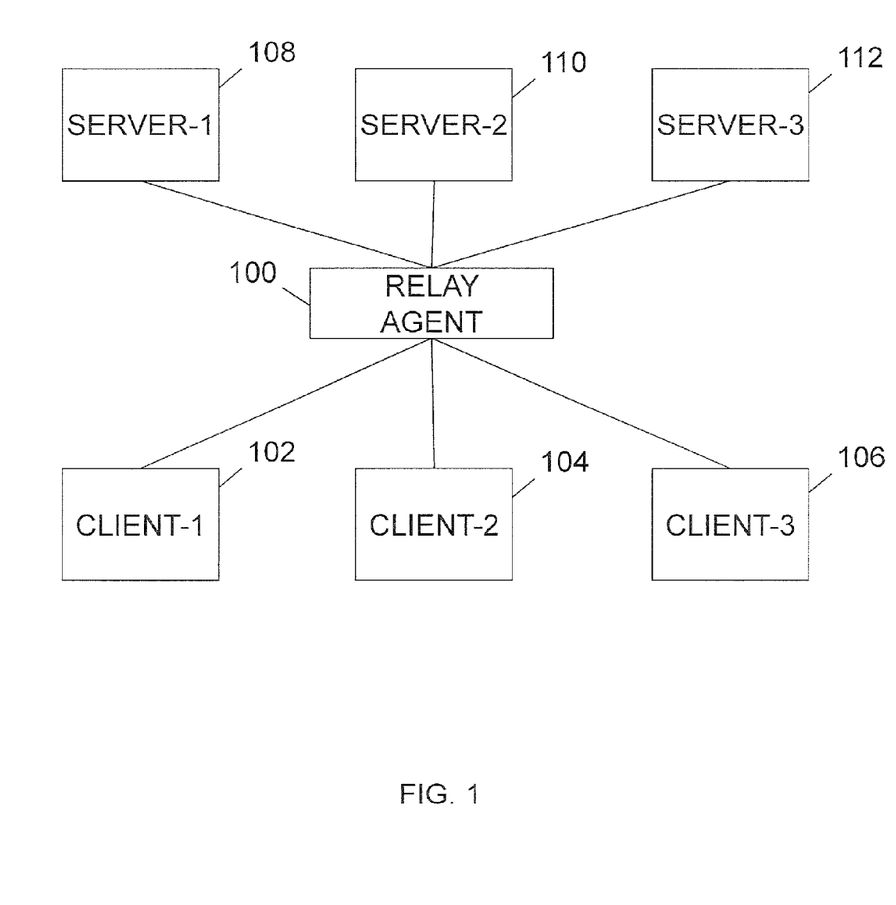
FIG. 1 is a diagram illustrating an exemplary Diameter network.

FIG. 1 is a diagram illustrating an exemplary Diameter network. Referring to FIG. 1, the exemplary Diameter network includes a Diameter relay agent 100, Diameter clients (e.g., (e.g., Client-1 102, Client-2 104, and Client-3 106), and Diameter servers (e.g., Server-1 108, Server-2 110, and Server-3 112). Diameter relay agent 100 may represent a conventional or simple Diameter relay or a Diameter proxy agent for receiving Diameter messages and routing the Diameter messages to appropriate destination using information stored in the Diameter messages. For example, Diameter relay agent 100 may receive a Diameter request message from a Client-1 102 and may send the Diameter request message to a particular realm or destination, such as Server-1 108. In another example, a Diameter request message may traverse zero or more intermediate agents (e.g., zero or more Diameter relays) between Client-1 102 and Server-1 108.

Each of Client-1 102, Client-2 104, and Client-3 106 may represent any suitable entity (e.g., software executing on a processor) capable of communicating using a Diameter-based protocol. For example, each of Client-1 102, Client-2 104, and Client-3 106 may be a Diameter node for requesting or accessing a service or information from a Diameter server, e.g., Server-1 108, Server-2 110, and Server-3 112.

Each of Server-1 108, Server-2 110, and Server-3 112 may represent any suitable entity (e.g., software executing on a processor) capable of communicating using a Diameter-based protocol. For example, each of Server-1 108, Server-2 110, and Server-3 112 may be a Diameter node capable of providing a service or information to a Diameter client, e.g., Client-1 102, Client-2 104, and Client-3 106.

In some embodiments, each of nodes 102-112 may include functionality for processing various messages and each node may act as a Diameter client or a Diameter server in various circumstances. For example, Client-1 102 may act as a Diameter client in a first transaction but may act a Diameter server in a second transaction. Similarly, in another example, Server-1 108 may act as a Diameter server in a first transaction but may act a Diameter client in a second transaction.

In some embodiments, each of nodes 102-112 may be a Diameter client, a Diameter server, a mobility management entity (MME), a proxy, a home subscriber server (HSS), an authentication, authorization, and/or accounting (AAA) server, a Diameter application server, a subscriber profile repository (SPR), or other Diameter entity.

In some embodiments, each of nodes 102-112 may include various Diameter capabilities, such as a Diameter protocol version, a Diameter application, a Diameter extension, and/or a security protocol. For example, Client-1 102 and Server-1 108 may be capable of using or supporting an S6a interface related application, Client-2 104 and Server-2 110 may be capable of using or supporting a Cx interface related application, and Client-3 106 and Server-3 112 may be capable of using or supporting a Gx interface related application.

Conventionally, Diameter nodes 102-112 may be unaware of each other's Diameter capabilities. When determining capabilities, a Diameter node may send a capability exchange request (CER) message to a second Diameter node and, in response, receive a capability exchange answer (CEA) message from the second Diameter node. Using information received, the Diameter nodes may continue communicating using appropriate capabilities determined by exchanging CER and CEA messages.

However, issues may arise when Diameter nodes attempt to communicate via intermediary nodes, such as Diameter relay agent 100. For example, Diameter relay agent 100 may support routing to multiple Diameter servers supporting multiple Diameter applications and may act as an intermediary node between one or more Diameter nodes 102-112. To determine Diameter capabilities of adjacent nodes, each of Diameter nodes 102-112 may send a CER message to Diameter relay agent 100 and may receive a CEA message from Diameter relay agent 100. The CEA message may indicate that Diameter relay agent 100 supports all applications regardless of whether one of Diameter nodes 102-112 actually supports all applications. Accordingly, Diameter nodes 102-112 believe Diameter relay agent 100 supports all applications, Diameter nodes 102-112 may attempt to utilize a particular application (e.g., a Cx related interface application). As such, nodes 102-112 may be unaware that no Diameter node is capable of supporting this application until error messages are received since the capabilities of Diameter nodes 102-112 are not propagated by relay agent 100.

Hence, Diameter relay agent 100 and Diameter, in general, fails to provide a generic mechanism for efficiently negotiating Diameter capabilities across relays. As such, Diameter nodes 102-112 cannot effectively discover common capabilities, such as Diameter applications and/or Diameter extensions, supported by both Diameter clients and Diameter servers.

In some embodiments, a generic mechanism is utilized for negotiating Diameter capabilities associated with nodes separated by one or more intermediary nodes. For example, using a Diameter capabilities negotiation relay (DCNR) mechanism, Diameter capabilities information can be shared between Diameter nodes (e.g., a Diameter client and a Diameter server, a Diameter client and a Diameter proxy, a first Diameter proxy and a second Diameter proxy, and/or a Diameter proxy and a Diameter server) regardless of intermediary nodes.

Figure 2:
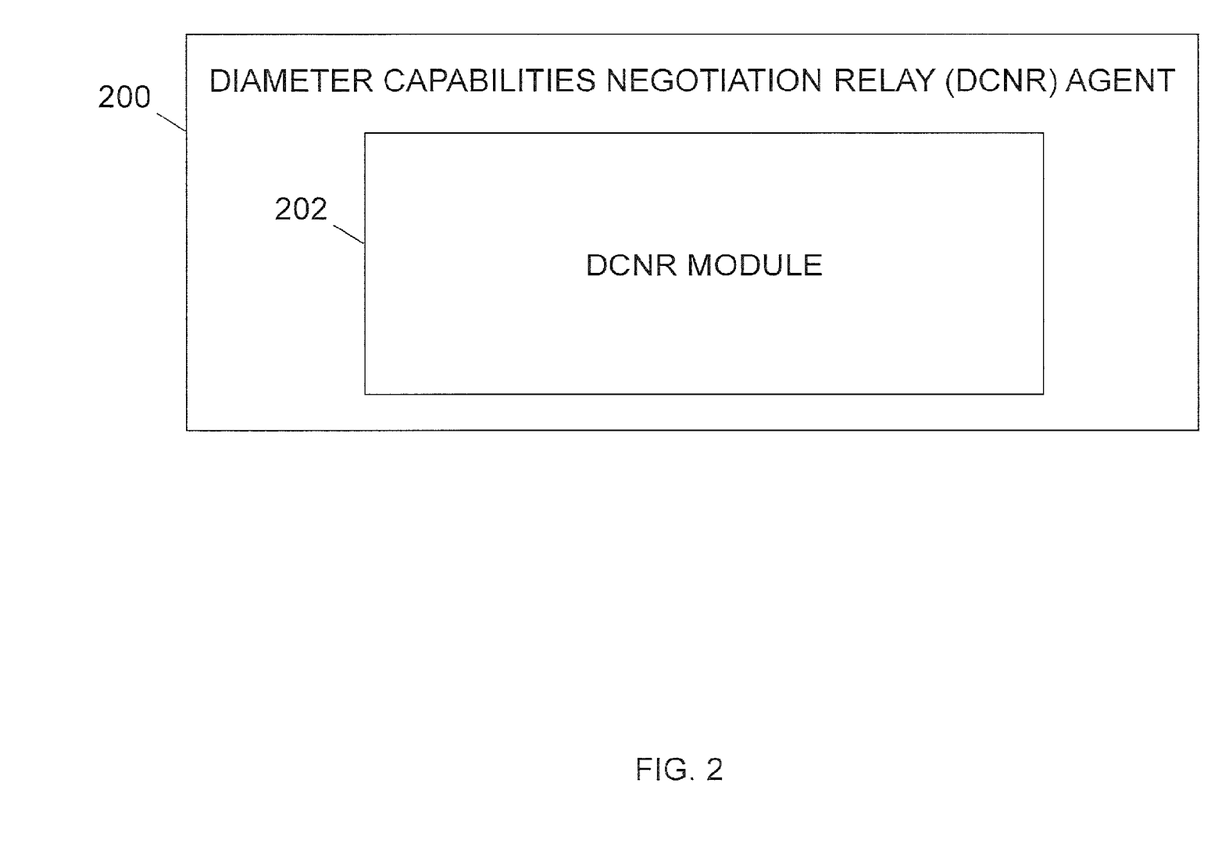
FIG. 2 is a diagram illustrating an exemplary DCNR agent according to an embodiment of the subject matter described herein.

FIG. 2 is a diagram illustrating exemplary DCNR agent 200 according to an embodiment of the subject matter described herein. Referring to FIG. 2, DCNR agent 200 may represent any suitable entity (e.g., software executing on a processor) for performing one or more aspects associated with negotiating Diameter capabilities and/or may include functionality for receiving and processing (e.g., routing, relaying, redirecting, proxying, and/or translating) Diameter signaling messages, such as DCNR related messages. In some embodiments, DCNR agent 200 may include or be part of a long term evolution (LTE) signaling router, a Diameter signaling router (e.g., an LTE or non-LTE Diameter signaling router, a Diameter proxy, a Diameter agent, a Diameter routing agent, a Diameter relay agent, Diameter translation agent, or a Diameter redirect agent. In some embodiments, such functionality may be included in one or more modules (e.g., a firewall module, a network address translation (NAT) module, a subscriber location module, and/or a routing module).

DCNR agent 200 may include a DCNR module 202. DCNR module may be configured to perform one or more aspects of negotiating Diameter capabilities, such as providing a generic (e.g., non-application specific) mechanism for Diameter capabilities negotiation. For example, DCNR module 202 may be configured to receive a capabilities negotiation request (CNR) message from Client-1 102 and may send the CNR message, or information therein, to Server-1 108. In this example, DCNR module 202 may be configured to receive a capabilities negotiation answer (CNA) message from Server-1 108 and may send the CNA message, or information therein, to Client-1 102.

DCNR agent 200 and/or DCNR module 202 may include various communications interfaces for communicating with Diameter nodes, e.g., 3rd Generation Partnership Project (3GPP) LTE communications interfaces and other (e.g., non-LTE) communications interfaces. Exemplary communications interfaces for communicating with Diameter nodes may include an LTE interface, an IMS interface, an IETF specification interface, a 3GPP specification interface, a Third Generation Partnership Project 2 (3GPP2) specification interface, a European Telecommunications Standards Institute (ETSI) specification interface, an International Telecommunications Union (ITU) specification interface, a PacketCable specification interface, a MultiService Forum (MSF) specification interface, an Sh interface, a Dx interface, a Ro interface, a Rf interface, an Sp interface, a Gx interface, a Rx interface, a Gz interface, a Gy interface, a Gq interface, a Zh interface, a Dz interface, a Zn interface, a Ty interface, a Tx interface, a Dw interface, a Wa interface, a Wd interface, a Wx interface, a Wm interface, a Wg interface, a Pr interface, a Gr interface, a Gr+ interface, a Gi interface, a Wo interface, a Wf interface, a Re interface, an S6 interface, an S2 interface, an SW interface, an Sta interface, an S7 interface, an H2 interface, an E2 interface, an E4 interface, an E5 interface, a A3 interface, a A4 interface, a Rr interface, a Gq' interface, a TC-6 interface, a TC-7 interface, a TC-8 interface, a TC-9 interface, a TC-10 interface, a TC-11 interface, a DB-0 interface, a DB-2 interface, a BI-1 interface, a LOC-1 interface, an Rw interface, a Pkt-mm-2 interface, a P-CSCF-PAM interface, a Pkt-laes-2 interface, an MM10 interface, an MZ interface, a Gmb interface, or a Zn' interface.

DCNR agent 200 and/or DCNR module 202 may facilitate communication between Diameter clients (e.g., (e.g., Client-1 102, Client-2 104, and Client-3 106), and Diameter servers (e.g., Server-1 108, Server-2 110, and Server-3 112). For example, Client-1 102 may send a Diameter request message (e.g., a Diameter session establishment request message) to DCNR agent 200 and/or DCNR module 202. The Diameter request message may require one or more services from Server-1 108. DCNR agent 200 and/or DCNR module 202 may route, relay, and/or translate requests or responses between Client-1 102 and Server-1 108. After receiving and processing the Diameter request message, the Diameter server may send a Diameter response message (e.g., a Diameter session establishment response message) to DCNR agent 200 and/or DCNR module 202. The Diameter response message may be sent in response to the Diameter request message originated by Client-1 102. DCNR agent 200 and/or DCNR module 202 may provide the Diameter response message to Client-1 102, e.g., using information stored in the Diameter response message.

In some embodiments, DCNR agent 200 and/or DCNR module 202 may communicate with other relay agents, such as relay agent 100. In such embodiments, relay agent 100 may be configured to forward, relay, or otherwise facilitate communications of DCNR related messages between a Diameter endpoint and DCNR agent 200 and/or DCNR module 202.

In some embodiments, DCNR agent 200 and/or DCNR module 202 may include functionality for providing Diameter capabilities information to one or more interested and/or related nodes. For example, DCNR module 202 may be configured to provide Diameter capabilities information associated with Server-1 108 to one or more Diameter nodes that are located near Server-1 108 or that may interact with Server-1 108. In this example, various methods or techniques may be used for determining which nodes receive Diameter capabilities information associated with Server-1 108. Exemplary methods may include a subscription method, a location-based (e.g., next hop(s)) method, a network-based method, or preconfigured information (e.g., from a network operator).

In some embodiments, a subscription method or related approach may include a Diameter node (e.g., Client-1-102) subscribing, e.g., at DCNR agent 200 and/or DCNR module 202, to receive Diameter capabilities information regarding one or more other Diameter nodes, such as Server-1 108. In such embodiments, DCNR agent 200 may maintain a Diameter capabilities subscription database that tracks subscribing nodes and subscribed-to nodes. For example, when a Diameter node, such as Server-1 108, updates its Diameter capabilities, the Diameter node may send a Diameter capabilities update message (e.g., a capabilities report message) for providing updated Diameter capabilities information to DCNR agent 200. In response to receiving the Diameter capabilities update message, DCNR agent 200 and/or DCNR module 202 may access the Diameter capabilities subscription database to determine whether any Diameter nodes are subscribed to receive the updated Diameter capabilities information. In response to determining that one or more Diameter nodes are subscribed to receive the updated Diameter capabilities information, DCNR agent 200 and/or DCNR module 202 may communicate the updated Diameter capabilities information to the subscribing nodes.

In some embodiments, DCNR agent 200 and/or DCNR module 202 may include any suitable entity (e.g., a storage medium or non-transitory computer readable medium) for maintaining DCNR related information. For example, a database, random access memory, flash memory, or another computer readable medium may be used to store Diameter capabilities information associated with one or more Diameter nodes. In this example, DCNR agent 200 and/or DCNR module 202 may use stored data to include Diameter capabilities information in a capabilities report message to one or more Diameter nodes. For example, DCNR agent 200 and/or DCNR module 202 may receive, from Client-1 102, a request for Diameter capabilities associated with Server-2 110 and Server-3 112. In this example, DCNR agent 200 and/or DCNR module 202 may respond on behalf of Server-2 110 and Server-3 112 if the appropriate information is already stored at DCNR agent 200 and/or DCNR module 202.

In some embodiments, a capabilities report message may include information associated with one or more Diameter nodes. For example, DCNR agent 200 and/or DCNR module 202 may send a capabilities negotiation request message to each of Server-1 108, Server-2 110, and Server-3 112. In this example, DCNR agent 200 and/or DCNR module 202 may collect Diameter capabilities information from each of Server-1 108, Server-2 110, and Server-3 112 before sending a capabilities report message including Diameter capabilities information from Server-1 108, Server-2 110, and Server-3 112 to an interested Diameter node. In another example, DCNR agent 200 and/or DCNR module 202 may send multiple capabilities report messages, where each of the capabilities report messages includes only Diameter capabilities information from one of Server-1 108, Server-2 110, and Server-3 112.

In some embodiments, DCNR agent 200 and/or DCNR module 202 may participate and/or facilitate negotiation of Diameter applications or Diameter extensions, such as Diameter overload control. For example, DCNR agent 200 and/or DCNR module 202 may act as a Diameter proxy agent to negotiation overload related parameters, such as Diameter overload scope, between two Diameter nodes.

It will be appreciated that functionality described herein with regards to DCNR agent 200 or DCNR module 202 may be performed or utilized by DCNR agent 200 and/or DCNR module 202. It will also be appreciated that DCNR agent 200 or DCNR module 202 is for illustrative purposes and may include additional and/or different modules, nodes, or components. For example, DCNR module 202 may be a distinct node separate from DCNR agent 200.

Figure 3:
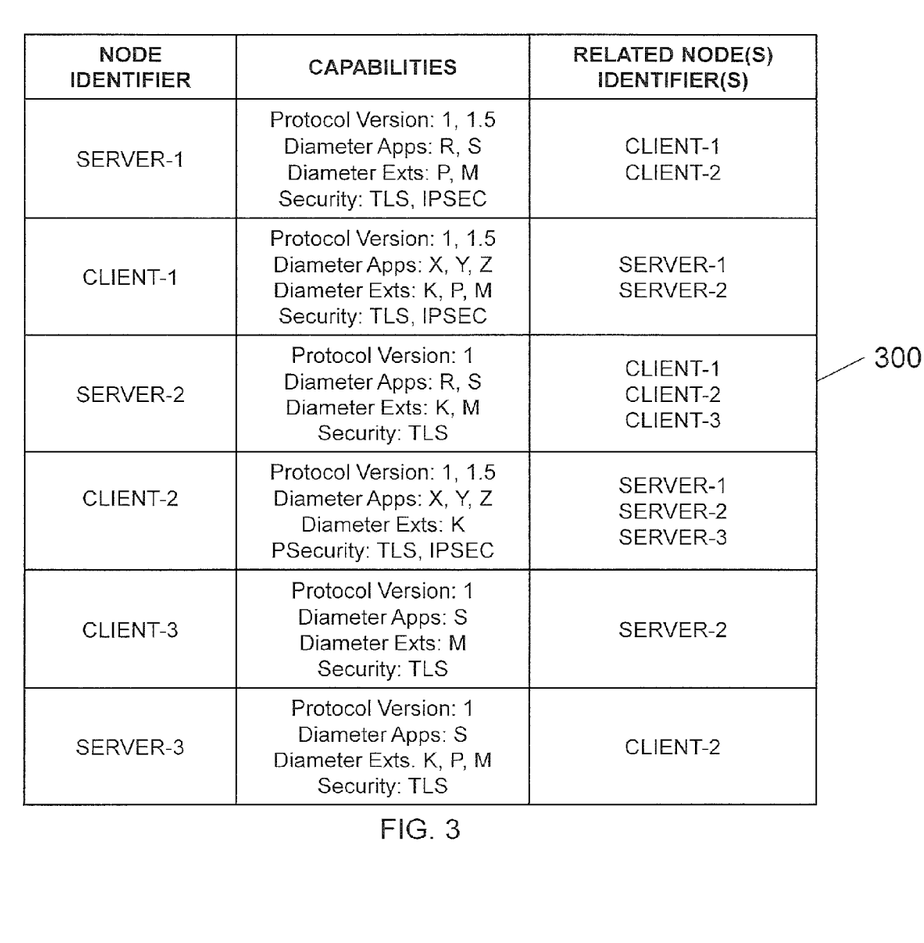
FIG. 3 is a diagram illustrating exemplary Diameter capabilities information according to an embodiment of the subject matter described herein.

FIG. 3 is a diagram illustrating exemplary DCNR related information 300 according to an embodiment of the subject matter described herein. In some embodiments, exemplary DCNR related information 300 may be accessed and/or stored by DCNR agent 200 and/or DCNR module 202 using various data structures.

Referring to FIG. 3, DCNR related information 300 may be depicted using a table representing associations between node identifiers (IDs) and Diameter capabilities and related or interested nodes IDs (e.g., IDs of nodes that are interested in receiving Diameter capabilities information). The DCNR related table of FIG. 3 may include a node ID field, a capabilities field, and a related node(s) field. The node ID field may include information for identifying a particular Diameter entity (or portions thereof), such as a uniform resource identifier (URI), a fully qualified domain name (FQDN), and/or network address information. The capabilities field may include one or more Diameter capabilities associated with a Diameter node, e.g., a Diameter protocol version ID, one or more supported Diameter applications, one or more Diameter extensions, and/or one or more supported security protocols. The related node(s) ID(s) field may include information for identifying one or more Diameter nodes (or portions thereof) that are to receive or request to receive Diameter capabilities information about a particular Diameter node.

As depicted in FIG. 3, DCNR related information 300 may indicate particular Diameter capabilities associated with Server-1 108 and indicate that Client-1 102 and Client-2 104 may receive Diameter capabilities information associated with Server-1 108. DCNR related information 300 may also indicate particular Diameter capabilities associated with Client-1 102 and indicate that Server-1 108 and Server-2 110 may receive Diameter capabilities information associated with Client-1 102. DCNR related information 300 may also indicate particular Diameter capabilities associated with Server-2 110 and indicate that Client-1 102, Client-2 104, and Client-3 106 may receive Diameter capabilities information associated with Server-2 110. DCNR related information 300 may also indicate particular Diameter capabilities associated with Client-2 104 and indicate that Server-1 108, Server-2 110, and Server-3 112 may receive Diameter capabilities information associated with Client-2 104. DCNR related information 300 may also indicate particular Diameter capabilities associated with Client-3 106 and indicate that Server-2 110 may receive Diameter capabilities information associated with Client-3 106. DCNR related information 300 may also indicate particular Diameter capabilities associated with Server-3 106 and indicate that Client-2 104 may receive Diameter capabilities information associated with Server-3 106.

It will also be appreciated that DCNR related information 300 is for illustrative purposes and that different and/or additional information may be stored, accessed, and/or used.

Figure 4:
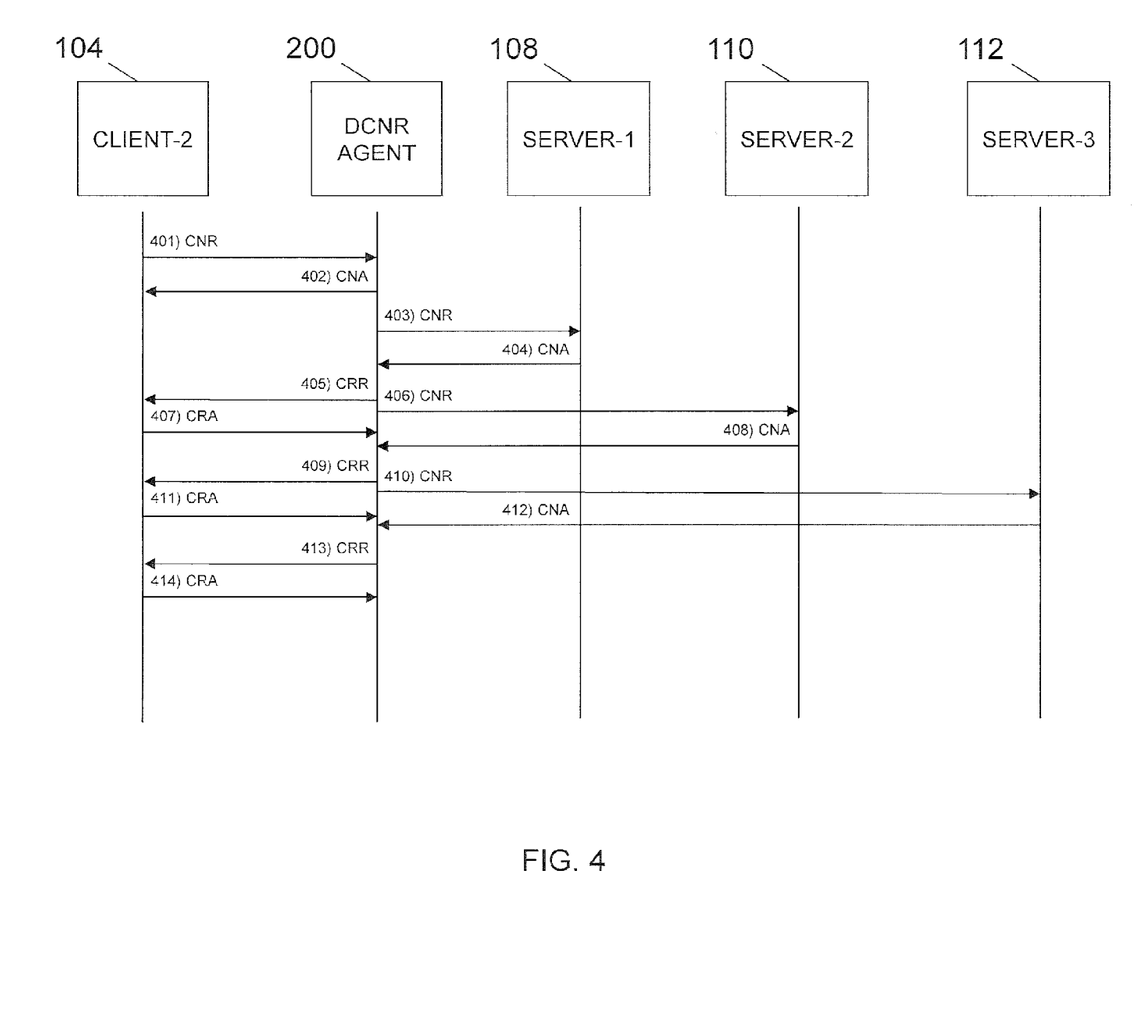
FIG. 4 is a diagram illustrating exemplary messages associated with Diameter capabilities negotiation according to an embodiment of the subject matter described herein.

FIG. 4 is a diagram illustrating exemplary messages associated with Diameter capabilities negotiation according to an embodiment of the subject matter described herein. In some embodiments, DCNR agent 200 may include DCNR module 202 and/or perform functionality similar to DCNR module 202. It will be appreciated that functionality described herein with regards to DCNR agent 200 or DCNR module 202 may be performed or utilized by DCNR agent 200 and/or DCNR module 202.

In some embodiments, Diameter nodes (e.g., Diameter servers, Diameter client, Diameter relay agents, and/or Diameter proxies) that support a DCNR mechanism as described herein may advertise support for the DCNR mechanism in CER/CEA hop-by-hop capabilities exchange messages. After identifying DCNR capable Diameter nodes, such nodes may exchange DCNR related messages.

Referring to FIG. 4, at step 401, a capabilities negotiation request (CNR) message may be sent from Client-2 104 to DCNR agent 200. In some embodiments, the CNR message may include Diameter capabilities information, such as a list of supported capabilities associated with Client-2 104. For example, this list may include Diameter applications and Diameter extensions that are supported by DCNR agent 200.

At step 402, in response to receiving the CNR message, a capabilities negotiation answer (CNA) message may be generated and sent from DCNR agent 200 to Client-2 104. In some embodiments, the CNA message may include Diameter capabilities information, such as a list of supported capabilities associated with DCNR agent 200. For example, this list may include Diameter applications and Diameter extensions that are supported by DCNR agent 200.

In some embodiments, DCNR agent 200 may be configured to generate and send a CNR message to one or more Diameter nodes. For example, DCNR agent 200 may access network topology information or other information and send a CNA message to all known next hops.

In some examples, DCNR agent 200 may send a CNR message via a flooding algorithm or another propagation algorithm, e.g., without prior knowledge of network topology. Various implementations may be used to optimize bandwidth utilization and/or message propagation. For example, messages may be sent to certain nodes depending on the type of requesting node, e.g., a CNR message may be sent only to Diameter servers if an original CNR came from a Diameter client and vice versa. In another example, messages may be limited to a certain number of hops traveled or a time to live parameter value. In yet another example, restricting a direction in which a message can travel may be used.

In some embodiments, DCNR agent 200 may store DCNR state information or related data. For example, DCNR agent 200 may maintain information about all Diameter nodes that sent CNR messages such that DCNR agent 200 can provide relevant capabilities report messages to each of these Diameter nodes.

In some embodiments, in response to receiving a CNR message, DCNR agent 200 may determine one or more relevant nodes to request Diameter capabilities information. For example, DCNR agent 200 may access DCNR information 300 stored in memory and determine that Server-1 108, Server-2 110, and Server-3 112 should receive a CNR message in response to Client-2 104 sending an original CNR message. In this example, Client-2 104 may have previously requested these Diameter servers be queried or may have indicated in the original CNR message to query all relevant Diameter Servers.

At step 403, a CNR message may be sent from DCNR agent 200 to Server-1 108. In some embodiments, the CNR message may include Diameter capabilities information, such as a list of supported capabilities associated with Client-2 104 and/or DCNR agent 200.

In some embodiments, DCNR agent 200 may generate one or more capabilities report request (CRR) messages based on received Diameter capabilities information and may send the one or more CRR messages to Client-2 104 and/or other interested Diameter nodes. For example, DCNR agent 200 may be configured to generate and send CRR messages to a plurality of Diameter clients, e.g., Client-1 102, Client-2 104, and Client-3 106. In another example, DCNR agent 200 may be configured to generate and send one or more CRR messages after receiving multiple CNA messages.

In some embodiments, DCNR agent 200 may generate one or more capabilities report request (CRR) messages based on received Diameter capabilities information and may the one or more CRR messages to Client-2 104 and/or other interested Diameter nodes. For example, DCNR agent 200 may be configured to generate and send CRR messages to a plurality of Diameter clients, e.g., Client-1 102, Client-2 104, and Client-3 106. In another example, DCNR agent 200 may be configured to generate and send one or more CRR messages after receiving multiple CNA messages.

At step 405, a CRR message may be sent from DCNR agent 200 to Client-2 104. In some embodiments, the CRR message may include Diameter capabilities information associated with Server-1 108 obtained from a CNA message.

At step 406, a CNR message may be sent from DCNR agent 200 to Server-2 110. In some embodiments, the CNR message may include Diameter capabilities information, such as a list of supported capabilities associated with Client-2 104 and/or DCNR agent 200.

At step 407, a capabilities report answer message (CRA) message may be sent from Client-2 104 to DCNR agent 200. In some embodiments, the CRA message may indicate that a corresponding CRR message was received.

At step 408, in response to receiving the CNR message from DCNR agent 200, a CNA message may be generated and sent from Server-2 110 to DCNR agent 200. In some embodiments, the CNA message may include Diameter capabilities information, such as a list of supported capabilities associated with Server-2 110.

At step 409, a CRR message may be sent from DCNR agent 200 to Client-2 104. In some embodiments, the CRR message may include Diameter capabilities information associated with Server-2 110 obtained from a CNA message.

At step 410, a CNR message may be sent from DCNR agent 200 to Server-3 112. In some embodiments, the CNR message may include Diameter capabilities information, such as a list of supported capabilities associated with Client-2 104 and/or DCNR agent 200.

At step 411, a CRA message may be sent from Client-2 104 to DCNR agent 200. In some embodiments, the CRA message may indicate that a corresponding CRR message was received.

At step 412, in response to receiving the CNR message from DCNR agent 200, a CNA message may be generated and sent from Server-3 112 to DCNR agent 200. In some embodiments, the CNA message may include Diameter capabilities information, such as a list of supported capabilities associated with Server-3 112.

At step 413, a CRR message may be sent from DCNR agent 200 to Client-2 104. In some embodiments, the CRR message may include Diameter capabilities information associated with Server-3 112 obtained from a CNA message.

At step 413, a CRA message may be sent from Client-2 104 to DCNR agent 200. In some embodiments, the CRA message may indicate that a corresponding CRR message was received.

It will be appreciated that the above described messages are for illustrative purposes and that different and/or additional messages may be used. It will also be appreciated that the above described messages may be sent or received in a different order than depicted. For example, DCNR agent 200 may be configured to send a CNR message to a new Diameter server only after receiving a CRA message regarding a preceding Diameter server.

Figure 5:
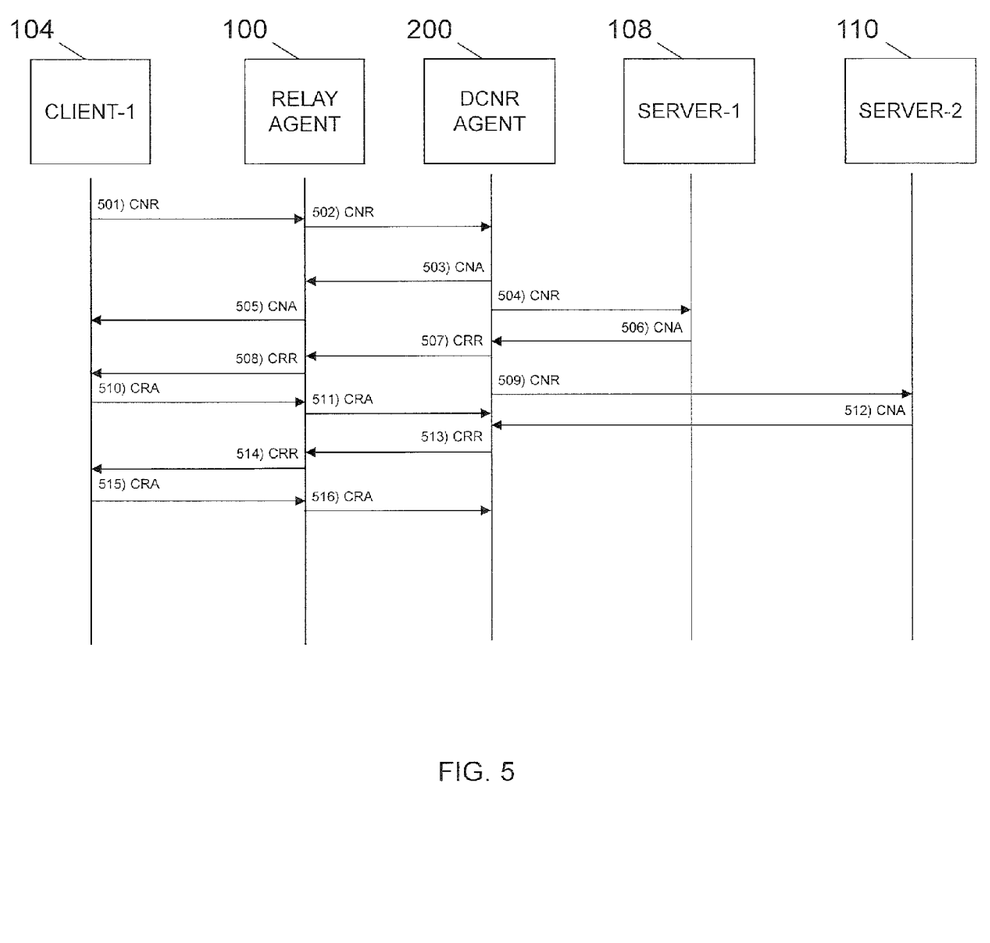
FIG. 5 is a diagram illustrating exemplary messages associated with Diameter capabilities negotiation according to another embodiment of the subject matter described herein.

FIG. 5 is a diagram illustrating exemplary messages associated with Diameter capabilities negotiation according to an embodiment of the subject matter described herein. In the embodiment illustrated in FIG. 5, relay agent 100 may be a simple Diameter relay or proxy node and may be incapable or not configured to perform DCNR related functions. For example, relay agent 100 may not be able to correctly route one or more DCNR related messages. In the embodiment illustrated in FIG. 5, relay agent 100 may be configured to support a DCNR application by routing or providing DCNR related messages to DCNR agent 200.

In some embodiments, DCNR agent 200 may include DCNR module 202 and/or perform functionality similar to DCNR module 202. It will be appreciated that functionality described herein with regards to DCNR agent 200 or DCNR module 202 may be performed or utilized by DCNR agent 200 and/or DCNR module 202.

In some embodiments, Diameter nodes (e.g., Diameter servers, Diameter client, Diameter relay agents, and/or Diameter proxies) that support a DCNR mechanism as described herein may advertise support for the DCNR mechanism in CER/CEA hop-by-hop capabilities exchange messages. After identifying DCNR capable Diameter nodes, such nodes may exchange DCNR related messages.

Referring to FIG. 5, at step 501, a capabilities negotiation request (CNR) message may be sent from Client-1 102 to relay agent 100. In some embodiments, the CNR message may include Diameter capabilities information, such as a list of supported capabilities associated with Client-1 102.

At step 502, the CNR message may be forwarded or routed from relay agent 100 to DCNR agent 200. For example, relay agent 100 may be configured with network address information so as to route DCNR messages to DCNR agent 200.

At step 503, in response to receiving the CNR message, a CNA message may be generated and sent from DCNR agent 200 to relay agent 100. In some embodiments, the CNA message may include Diameter capabilities information, such as a list of supported capabilities associated with DCNR agent 200. In some embodiments, DCNR agent 200 may be configured to generate and send a CNR message to one or more Diameter nodes. For example, DCNR agent 200 may access network topology information or other information and send a CNA message to all known next hops.

At step 504, a CNR message may be sent from DCNR agent 200 to Server-1 108. In some embodiments, the CNR message may include Diameter capabilities information, such as a list of supported capabilities associated with Client-1 102 and/or DCNR agent 200.

At step 505, the CNA message may be forwarded or routed from relay agent 100 to Client-1 102.

At step 506, in response to receiving the CNR message from DCNR agent 200, a CNA message may be generated and sent from Server-1 108 to DCNR agent 200. In some embodiments, the CNA message may include Diameter capabilities information, such as a list of supported capabilities associated with Server-1 108.

In some embodiments, DCNR agent 200 may generate one or more capabilities report request (CRR) messages based on received Diameter capabilities information and may send the one or more CRR messages to Client-1 102 and/or other interested Diameter nodes.

At step 507, a CRR message may be sent from DCNR agent 200 to relay agent 100. In some embodiments, the CRR message may include Diameter capabilities information associated with Server-1 108 obtained from a CNA message.

At step 508, the CRR message may be forwarded or routed from relay agent 100 to Client-1 102.

At step 509, a CNR message may be sent from DCNR agent 200 to Server-2 110. In some embodiments, the CNR message may include Diameter capabilities information, such as a list of supported capabilities associated with Client-1 102 and/or DCNR agent 200.

At step 510, a CRA message may be sent from Client-1 102 to relay agent 100. In some embodiments, the CRA message may indicate that a corresponding CRR message was received.

At step 511, the CRA message may be forwarded or routed from relay agent 100 to DCNR agent 200.

At step 512, in response to receiving the CNR message from DCNR agent 200, a CNA message may be generated and sent from Server-2 110 to DCNR agent 200. In some embodiments, the CNA message may include Diameter capabilities information, such as a list of supported capabilities associated with Server-2 110.

At step 513, a CRR message may be sent from DCNR agent 200 to relay agent 100. In some embodiments, the CRR message may include Diameter capabilities information associated with Server-2 110 obtained from a CNA message.

At step 514, the CRR message may be forwarded or routed from relay agent 100 to Client-1 102.

At step 515, a CRA message may be sent from Client-1 102 to relay agent 100. In some embodiments, the CRA message may indicate that a corresponding CRR message was received.

At step 516, the CRA message may be forwarded or routed from relay agent 100 to DCNR agent 200.

It will be appreciated that the above described messages are for illustrative purposes and that different and/or additional messages may be used. It will also be appreciated that the above described messages may be sent or received in a different order than depicted.

Figure 6:
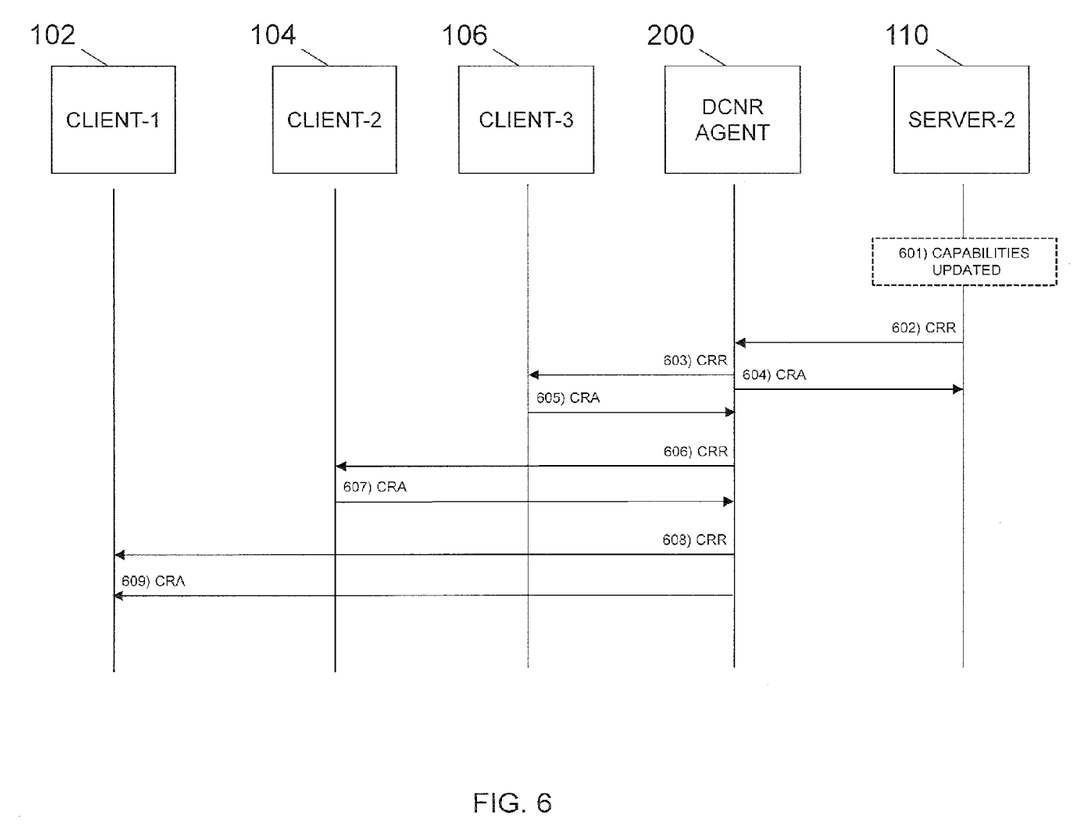
FIG. 6 is a diagram illustrating exemplary messages associated with providing updated Diameter capabilities information according to an embodiment of the subject matter described herein.

FIG. 6 is a diagram illustrating exemplary messages associated with providing updated Diameter capabilities information according to an embodiment of the subject matter described herein. In the embodiment illustrated in FIG. 6, Server-2 110 may be support a DCNR mechanism (e.g., a DCNR application) and may be configured to inform one or more Diameter nodes when its Diameter capabilities change, such as when Server-2 110 has a software upgrade.

In some embodiments, DCNR agent 200 may include DCNR module 202 and/or perform functionality similar to DCNR module 202. It will be appreciated that functionality described herein with regards to DCNR agent 200 or DCNR module 202 may be performed or utilized by DCNR agent 200 and/or DCNR module 202.

In some embodiments, Diameter nodes (e.g., Diameter servers, Diameter client, Diameter relay agents, and/or Diameter proxies) that support a DCNR mechanism as described herein may advertise support for the DCNR mechanism in CER/CEA hop-by-hop capabilities exchange messages. After identifying DCNR capable Diameter nodes, such nodes may exchange DCNR related messages.

Referring to FIG. 6, at step 601, Server-2 110 may be changed or altered such that Diameter capabilities information associated with Server-2 110. In some embodiments, Server-2 110 may be configured to send one or more DCNR related messages to inform other Diameter nodes regarding the updated Diameter capabilities information At step 602, a CRR message may be sent from Server-2 110 to DCNR agent 200. In some embodiments, the CRR message may include Diameter capabilities information associated with Server-2 110. For example, the CRR message may include "complete" Diameter capabilities information associated with Server-2 110 or may include only Diameter capabilities information that has changed since a previously sent DCNR related message.

In some embodiments, DCNR agent 200 may receive a CRR message and provide or propagate the CRR message or copies thereof to one or more interested Diameter nodes. For example, DCNR agent 200 may relay CRR messages to one or more Diameter nodes based on a subscription method, a location method, or using other methods, such as preconfigured information from a network operator.

At step 603, the CRR message or a copy thereof may be forwarded or routed from DCRN agent 200 to Client-3 106.

At step 604, a CRA message may be sent from DCNR agent 200 to Server-2 110. In some embodiments, the CRA message may indicate that a corresponding CRR message (e.g., from step 602) was received.

At step 605, a CRA message may be sent from Client-3 106 to DCNR agent 200. In some embodiments, the CRA message may indicate that a corresponding CRR message (e.g., from step 603) was received.

At step 606, the CRR message or a copy thereof may be forwarded or routed from DCRN agent 200 to Client-2 104.

At step 607, a CRA message may be sent from Client-2 104 to DCNR agent 200. In some embodiments, the CRA message may indicate that a corresponding CRR message (e.g., from step 606) was received.

At step 608, the CRR message or a copy thereof may be forwarded or routed from DCRN agent 200 to Client-1 102.

At step 609, a CRA message may be sent from Client-1 102 to DCNR agent 200. In some embodiments, the CRA message may indicate that a corresponding CRR message (e.g., from step 608) was received.

It will be appreciated that the above described messages are for illustrative purposes and that different and/or additional messages may be used. It will also be appreciated that the above described messages may be sent or received in a different order than depicted.

Figure 7:
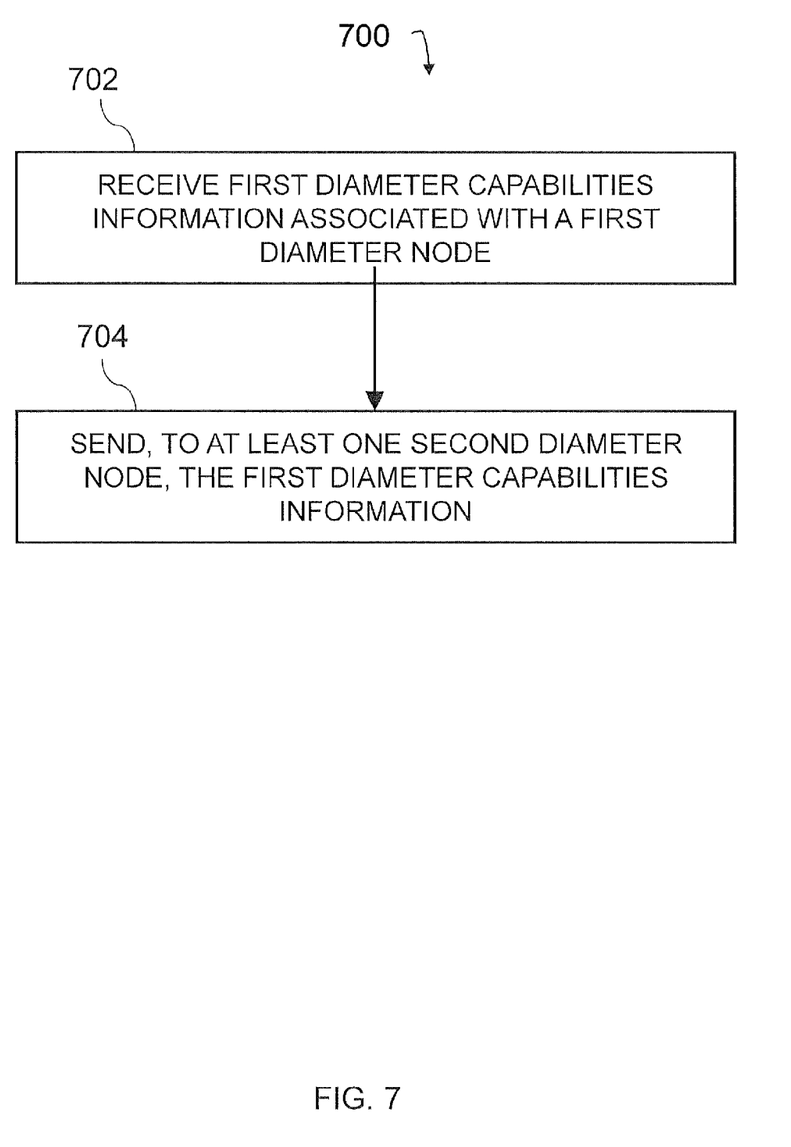
FIG. 7 is a diagram illustrating an exemplary process for negotiating Diameter capabilities according to an embodiment of the subject matter described herein.

FIG. 7 is a diagram illustrating an exemplary process 700 for negotiating Diameter capabilities according to an embodiment of the subject matter described herein. In some embodiments, exemplary process 700, or portions thereof, may be performed by or at DCNR agent 200, DCNR module 202, and/or another node or module. In some embodiments, exemplary process 700 may include steps 702, 704, 706, and/or 708.

Referring to exemplary process 700, at step 702, first Diameter capabilities information associated with a first Diameter node may be received. For example, DCNR module 202 may receive a CNR message containing information about various Diameter capabilities associated with Client-2 104. In this example, the CNR message may include information about a Diameter protocol version, a Diameter application, a Diameter extension, and/or a security protocol usable for communicating with Client-2 104.

In some embodiments, first Diameter capabilities information may be sent from a second Diameter relay agent or the first Diameter node. For example, relay agent 100 may be configured to relay a CNR message from Client-1 102 to DCNR agent 200 and/or DCNR module 202. In another example, a CNR message may be sent from Client-1 102 to DCNR agent 200 and/or DCNR module 202 without traversing relay agent 100.

At step 704, the first Diameter capabilities information may be sent to at least one second Diameter node. For example, DCNR module 202 may send a CNR message to Server-2 110.

In some embodiments, sending first Diameter capabilities information may include sending the first Diameter capabilities information to a plurality of nodes. In another example, DCNR module 202 may forward a CNR message to Server-1 108, Server-2 110, and Server-3 112.

In some embodiments, the plurality of nodes may be determined using a subscription method, a location-based method, a network-based method, or preconfigured information. For example, a plurality of nodes may request (e.g., via a subscription mechanism) to receive Diameter capabilities information about a particular Diameter node from DCNR module 202.

In some embodiments, second Diameter capabilities information associated with at least one second Diameter node may be received from the at least one second Diameter node. For example, DCNR module 202 may receive a CNA message from Server-2 110. In this example, the CNA message may include information about a Diameter protocol version, a Diameter application, a Diameter extension, and/or a security protocol usable for communicating with Server-2 110.

In some embodiments, receiving second Diameter capabilities information may include receiving, from a plurality of nodes, corresponding Diameter capabilities information associated with the plurality of nodes. For example, in response to receiving a CNR message, each of Server-1 108, Server-2 110, and Server-3 112 may send a CNA message to DCNR module 202. In another example, Server-1 108 may be upgraded with additional Diameter capabilities and may send a CRR or other message that includes information about the updated Diameter capabilities to DCNR module 202.

In some embodiments, second Diameter capabilities information (e.g., Diameter capabilities information associated with the at least one second Diameter node) may be sent to the first Diameter node.

In some embodiments, sending Diameter capabilities information may include sending a capabilities report message, e.g., a CRR message. For example, DCNR module 202 may receive a CNA message from Server-2 110 and may use information in the CNA message to generate a CRR message. The CRR message may be sent to Client-2 104 and may include Diameter capabilities information associated with Server-2 110.

In some embodiments, a capabilities report message includes Diameter capabilities information associated with one or more nodes. For example, a CRR message may be sent to multiple nodes that subscribe to receive information about a particular Diameter node.

In some embodiments, in response to receiving updated Diameter capabilities information associated with at least the second Diameter node, the updated Diameter capabilities information may be sent to the first Diameter node. For example, in response to receiving a CRR or other message from Server-1 108, DCNR module 202 may send a CRR message to Client-1 102 and/or another node.

In some embodiments, Diameter capabilities information may include information about a Diameter protocol version, a Diameter application, a Diameter extension, a security protocol, or any Diameter capability.

In some embodiments, a Diameter node may include a Diameter client (e.g., Client-1 102, Client-2 104, or Client-3 106), a Diameter server (e.g., Server-1 108, Server-2 110, and Server-3 112), a Diameter routing agent, a Diameter signaling router, a Diameter proxy agent, or a Diameter peer node.

It will be appreciated that functionality described herein with regards to DCNR agent 200 or DCNR module 202 may be performed or utilized by DCNR agent 200 and/or DCNR module 202.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for negotiating Diameter capabilities, the method comprising:

at a Diameter relay agent implemented using at least one hardware processor and a non-transitory computer readable medium having stored thereon executable instructions that are configured to be executed by the at least one hardware processor:

receiving, from a requesting node, a capabilities negotiation request (CNR) message for requesting Diameter capabilities information associated with at least one first Diameter node that is separate from the Diameter relay agent;

in response to receiving the CNR message, determining the at least one first Diameter node for which the Diameter capabilities information is requested based on node identifying information received in a prior CNR message and determining that the Diameter capabilities information associated with the at least one first Diameter node is stored and accessible by the Diameter relay agent; and in response to determining that the Diameter capabilities information is stored and accessible by the Diameter relay agent, sending, by the Diameter relay agent, the Diameter capabilities information on behalf of the at least one first Diameter node without sending the CNR message to the at least one first Diameter node.

2. The method of claim 1 comprising:
in response to determining that the Diameter capabilities information is not stored or is inaccessible by the Diameter relay agent, sending the CNR message to the at least one first Diameter node;
receiving, from the at least one first Diameter node, the Diameter capabilities information associated with the at least one first Diameter node; and
sending, to the requesting node, the Diameter capabilities information associated with the at least one first Diameter node.

3. The method of claim 2 wherein receiving, from the at least one first Diameter node, the Diameter capabilities information associated with the at least one first Diameter node includes receiving, from a plurality of nodes, Diameter capabilities information associated with the plurality of nodes.

4. The method of claim 1 comprising:
sending the Diameter capabilities information to a plurality of nodes, wherein the plurality of nodes is determined using a subscription method, a location-based method, a network-based method, or preconfigured information.

5. The method of claim 1 wherein the Diameter capabilities information is sent from a second Diameter relay agent or the at least one first Diameter node.

6. The method of claim 1 wherein the Diameter capabilities information includes information about a Diameter protocol version, a Diameter application, a Diameter extension, or a security protocol.

7. The method of claim 1 wherein the at least one first Diameter node includes a Diameter client, a Diameter server, a Diameter routing agent, a Diameter proxy agent, a Diameter signaling router, or a Diameter peer node.

8. The method of claim 1 wherein sending the Diameter capabilities information includes sending a capabilities report message.

9. The method of claim 8 wherein the capabilities report message includes Diameter capabilities information associated with one or more nodes.

10. A system for routing a Diameter message, the system comprising:
a Diameter relay agent, the Diameter relay agent comprising:
at least one hardware processor;
a non-transitory computer readable medium; and
a Diameter capabilities negotiation relay (DCNR) module implemented using the at least one hardware processor and a non-transitory computer readable medium having stored thereon executable instructions that are configured to be executed by the at least one hardware processor, wherein the DCNR module is configured to receive, from a requesting node, a capabilities negotiation request (CNR) message for requesting Diameter capabilities information associated with at least one first Diameter node that is separate from the Diameter relay agent, in response to receiving the CNR message, to determine the at least one first Diameter node for which the Diameter capabilities information is requested based on node identifying information received in a prior CNR message and determine that the Diameter capabilities information associated with the at least one first Diameter node is stored and accessible by the Diameter relay agent, and in response to determining that the Diameter capabilities information is stored and accessible by the Diameter relay agent, to send, by the Diameter relay agent, the Diameter capabilities information on behalf of the at least one first Diameter node without sending the CNR message to the at least one first Diameter node.

11. The system of claim 10 wherein the DCNR module is configured to in response to determining that the Diameter capabilities information is not stored or is inaccessible by the Diameter relay agent, to send the CNR message to the at least one first Diameter node, to receive, from the at least one first Diameter node, the Diameter capabilities information associated with the at least one first Diameter node and to send, to requesting node, the Diameter capabilities information associated with the at least one first Diameter node.

12. The system of claim 11 wherein receiving, from the at least one first Diameter node, the Diameter capabilities information associated with the at least one first Diameter node includes receiving, from a plurality of nodes, Diameter capabilities information associated with the plurality of nodes.

13. The system of claim 10 wherein the DCNR module is configured to send the Diameter capabilities information to a plurality of nodes, wherein the plurality of nodes is determined using a subscription method, a location-based method, a network-based method, or preconfigured information.

14. The system of claim 10 wherein the Diameter capabilities information is sent from a second Diameter relay agent or the at least one first Diameter node.

15. The system of claim 10 wherein the Diameter capabilities information includes information about a Diameter protocol version, a Diameter application, a Diameter extension, or a security protocol.

16. The system of claim 10 wherein the at least one first Diameter node includes a Diameter client, a Diameter server, a Diameter routing agent, a Diameter proxy agent, a Diameter signaling router, or a Diameter peer node.

17. The system of claim 10 wherein the DCNR module is configured to send a capabilities report message.

18. The system of claim 17 wherein the capabilities report message includes Diameter capabilities information associated with one or more nodes.

19. A non-transitory computer readable medium comprising computer executable instructions embodied in the non-transitory computer readable medium that when executed by a processor of a computer control the computer to perform steps comprising:
at a Diameter relay agent implemented using at least one hardware processor and a non-transitory computer readable medium having stored thereon executable instructions that are configured to be executed by the at least one hardware processor:
receiving, from a requesting node, a capabilities negotiation request (CNR) message for requesting Diameter capabilities information associated with at least one first Diameter node that is separate from the Diameter relay agent;
in response to receiving the CNR message, determining the at least one first Diameter node for which the Diameter capabilities information is requested based on node identifying information received in a prior CNR message and determining that the Diameter capabilities information associated with the at least one first Diameter node is stored and accessible by the Diameter relay agent; and in response to determining that the Diameter capabilities information is stored and accessible by the Diameter relay agent, sending, by the Diameter relay agent, the Diameter capabilities information on behalf of the at least one first Diameter node without sending the CNR message to the at least one first Diameter node.

* * * * *

UNITED STATES PATENT AND TRADEMARK OFFICE
CERTIFICATE OF CORRECTION

| | | |
|---|---|---|
| PATENT NO. | : 9,888,001 B2 | Page 1 of 1 |
| APPLICATION NO. | : 14/166772 | |
| DATED | : February 6, 2018 | |
| INVENTOR(S) | : Donovan | |

It is certified that error appears in the above-identified patent and that said Letters Patent is hereby corrected as shown below:

In Column 9, Line 28, below "agent 200." insert -- At step 404, in response to receiving the CNR message from DCNR agent 200, a CNA message may be generated and sent from Server-1 108 to DCNR agent 200. In some embodiments, the CNA message may include Diameter capabilities information, such as a list of supported capabilities associated with Server-1 108. --, as a new paragraph.

In Column 9, Lines 39-48, below "messages." delete "In some embodiments, DCNR agent 200 may generate one or more capabilities report request (CRR) messages based on received Diameter capabilities information and may the one or more CRR messages to Client-2 104 and/or other interested Diameter nodes. For example, DCNR agent 200 may be configured to generate and send CRR messages to a plurality of Diameter clients, e.g., Client-1 102, Client-2 104, and Client-3 106. In another example, DCNR agent 200 may be configured to generate and send one or more CRR messages after receiving multiple CNA messages.".

Signed and Sealed this
Ninth Day of October, 2018

Andrei Iancu
*Director of the United States Patent and Trademark Office*